(12) United States Patent
Okada et al.

(10) Patent No.: US 10,086,865 B2
(45) Date of Patent: Oct. 2, 2018

(54) STEERING DEVICE

(71) Applicant: NSK LTD, Tokyo (JP)

(72) Inventors: Shinji Okada, Maebashi (JP); Yuuichi Tomaru, Maebashi (JP)

(73) Assignee: NSK Ltd (JP)

( * ) Notice: Subject to any disclaimer, the term of this patent is extended or adjusted under 35 U.S.C. 154(b) by 38 days.

(21) Appl. No.: 15/127,905

(22) PCT Filed: Jan. 14, 2016

(86) PCT No.: PCT/JP2016/051035
§ 371 (c)(1),
(2) Date: Sep. 21, 2016

(87) PCT Pub. No.: WO2016/114366
PCT Pub. Date: Jul. 21, 2016

(65) Prior Publication Data
US 2017/0355393 A1 Dec. 14, 2017

(30) Foreign Application Priority Data
Jan. 14, 2015 (JP) .................................. 2015-005129

(51) Int. Cl.
*B62D 1/19* (2006.01)
*B62D 1/185* (2006.01)
*B62D 1/184* (2006.01)
*B62D 1/189* (2006.01)
*F16H 25/14* (2006.01)

(52) U.S. Cl.
CPC ............. *B62D 1/192* (2013.01); *B62D 1/184* (2013.01); *B62D 1/185* (2013.01); *B62D 1/189* (2013.01); *F16H 25/14* (2013.01)

(58) Field of Classification Search
CPC ................................ B62D 1/192; B62D 1/185
See application file for complete search history.

(56) References Cited

U.S. PATENT DOCUMENTS 7,416,216 B2 * 8/2008 Shoda .................... B62D 1/185
280/775
8,047,096 B2 * 11/2011 Ridgway ................ B62D 1/184
280/775

(Continued)

FOREIGN PATENT DOCUMENTS

DE           10057861 A1 *  5/2002  ............... A61C 1/05
DE      102014101194 A1 *  8/2015  ............... F16C 3/035

(Continued)

*Primary Examiner* — Nicole T Verley
(74) *Attorney, Agent, or Firm* — Hartman Global IP Law; Gary M. Hartman; Domenica N. S. Hartman

(57) ABSTRACT

Construction is achieved of a steering device that is capable of preventing impact going forward from being applied to a support bracket even when a steering wheel is vigorously displaced to a front-end position when adjusting the forward-backward position of the steering wheel. Part of the stopper member 28 is supported by a fastening member such as a housing 10*a*. When an outer column 22*a* is displaced forward in a state in which the forward-backward position of the steering wheel can be adjusted, a portion that displaces forward together with the outer column 22*a* hits a pair of stopper surfaces 41 of the stopper member 28 before an adjustment rod hits a pair of long telescopic-adjustment holes.

8 Claims, 10 Drawing Sheets

(56) References Cited

U.S. PATENT DOCUMENTS

| | | | | |
|---|---|---|---|---|
| 9,481,390 B2* | 11/2016 | Martinez | ................ | B62D 1/195 |
| 2010/0210370 A1* | 8/2010 | Kwon | ...................... | B62D 1/16 |
| | | | | 464/180 |
| 2010/0300238 A1* | 12/2010 | Ridgway | ................ | B62D 1/184 |
| | | | | 74/493 |
| 2015/0096404 A1* | 4/2015 | Martinez | ................ | B62D 1/195 |
| | | | | 74/492 |
| 2015/0251684 A1* | 9/2015 | Chiba | .................... | B62D 1/195 |
| | | | | 74/493 |
| 2016/0039450 A1* | 2/2016 | Johta | ...................... | B62D 1/184 |
| | | | | 74/493 |
| 2016/0159387 A1* | 6/2016 | Okano | .................... | B62D 1/184 |
| | | | | 74/493 |
| 2016/0280248 A1* | 9/2016 | Uesaka | .................. | B62D 1/195 |
| 2016/0347349 A1* | 12/2016 | Yamamoto | ............... | B62D 1/19 |
| 2016/0369835 A1* | 12/2016 | Kurokawa | ............... | B62D 1/185 |
| 2017/0036690 A1* | 2/2017 | Jager | ...................... | B62D 1/185 |
| 2017/0101125 A1* | 4/2017 | Martinez | ................ | B62D 1/195 |
| 2017/0158220 A1* | 6/2017 | Appleyard | ............. | B62D 1/185 |
| 2017/0232994 A1* | 8/2017 | Sakuda | .................. | B62D 1/184 |
| | | | | 74/493 |
| 2017/0274922 A1* | 9/2017 | Uesaka | .................. | B62D 1/184 |
| 2017/0297607 A1* | 10/2017 | Orihara | ................ | B62D 1/192 |
| 2017/0305454 A1* | 10/2017 | Park | ...................... | B62D 1/185 |

FOREIGN PATENT DOCUMENTS

| | | | | |
|---|---|---|---|---|
| DE | 102016224271 A1 * | 2/2017 | ................ | B62D 1/20 |
| DE | 102016122573 A1 * | 6/2017 | ............... | F16C 19/16 |
| JP | 2012-086588 | 5/2012 | | |
| JP | 5030744 B2 * | 9/2012 | ............ | F16C 19/522 |
| JP | 2013-018472 | 1/2013 | | |
| JP | 5980992 B1 * | 8/2016 | | |
| JP | 3207410 U * | 11/2016 | ............ | F16C 19/163 |
| WO | WO-0055028 A1 * | 9/2000 | ............. | B62D 1/185 |
| WO | WO-2004033270 A1 * | 4/2004 | ............. | B62D 1/185 |
| WO | WO-2005070744 A1 * | 8/2005 | ............. | B62D 1/185 |
| WO | WO-2013002252 A1 * | 1/2013 | ............ | B23Q 11/123 |

* cited by examiner

STEERING DEVICE

TECHNICAL FIELD

The present invention relates to a steering device that makes it possible to adjust the forward-backward position of a steering wheel, and that has construction so that a steering column that is supported by a vehicle body can detach forward during a secondary collision.

BACKGROUND ART

FIG. 10 illustrates a steering device for an automobile having conventional construction. The rotation of a steering wheel 1 is transmitted to an input shaft 3 of a steering-gear unit 2, and as the input shaft 3 rotates, a pair of left and right tie rods 4 are pushed and pulled, which applies a steering angle to the front wheels. The steering wheel 1 is supported by and fastened to the rear-end section of a steering shaft 5, and that steering shaft 5 is passed in the axial direction through a cylindrical shaped steering column 6 and supported by the steering column 6 so as to rotate freely. The front-end section of the steering shaft 5 is connected to the rear-end section of an intermediate shaft 8 by way of a universal joint 7, and the front-end-section of the intermediate shaft 8 is connected to the input shaft 3 by way of another universal joint 9. The front-end section of the steering column 6 is connected to and supported by the rear-end section of a housing 10 that houses parts such as a speed reducer of an electric-powered power steering device, measurement devices and the like. An electric motor 11, which is the power source of the electric-powered power steering device, is supported by the housing 10. Unless otherwise noted, the forward-backward direction, the left-right direction (width direction), and the up-down direction respectively mean the forward-backward direction, left-right direction (width direction), and up-down direction of the vehicle.

As disclosed in JP2012086588 (A) and JP2013018472 (A), a tilt mechanism for adjusting the up-down position of the steering wheel 1, and a telescopic mechanism for adjusting the forward-backward position of the steering wheel 1 according to the physique and operating posture of the operator are assembled in the steering device. The tilt mechanism is constructed by the front-end section of the steering column 6 being supported by the vehicle body by way of a tilt pivot shaft 12 that is arranged in the width direction so as to be able to pivotally displace. Held sections 13 are fastened to a portion near the rear end of the middle section of the steering column 6, and the held sections 13 are held between a pair of left and right support-plate sections 16 of a support bracket 15 that is attached to the vehicle body 14. Long tilt-adjustment holes 18 that extend in the up-down direction are formed in portions of the pair of support-plate sections 16 that are aligned with each other. An adjustment rod 17 is passed through the long tilt-adjustment holes 18 of the held sections 13. The up-down position of the steering wheel 1 can be adjusted within the range that the adjustment rod 17 is able to displace inside the long tilt-adjustment holes 18.

The telescopic mechanism is constructed by the steering shaft 5 and steering column 6 that are able to expand and contract. The steering shaft 5 is constructed by combining and fitting together the rear-end section of an inner shaft 19 on the front side and the front-end section of an outer shaft 20 on the rear side with a non-circular fit such as a spline fit so as to be able to transmit torque and be able to displace in the axial direction. The steering column 6 is constructed by combining and fitting together the rear-end section of an inner column 21 on the front side and the front-end section of an outer column 22 on the rear side so as to be able to displace in the forward-backward direction. Long telescopic-adjustment holes 23 that extend in the axial direction of the steering column 6 are formed in the held sections 13. The adjustment rod 17 is also passed through the long telescopic-adjustment holes 23. The forward-backward position of the steering wheel 1 can be adjusted within the range that the adjustment rod 17 is able to displace in the long telescopic-adjustment holes 23.

A pair of pressure sections is provided in portions of both end sections in the axial direction of the adjustment rod 17 that protrude from the outside surfaces of the pair of support-plate sections 16, and an adjustment lever is provided on one end section in the axial direction of the adjustment rod 17. The space between the pair of pressure sections can be expanded or contracted by an expansion/contraction device that operates based on the operation of the adjustment lever.

By tilting the adjustment lever in a specified direction (typically, downward) when adjusting the up-down position or the forward-backward position of the steering wheel 1, the space between the pair of pressure sections is expanded, and the friction force that acts between the inside surfaces of the pair of support-plate sections 16 and the outside surfaces of the held sections 13 decreases. With this friction force in a decreased state, the position of the steering wheel 1 can be adjusted within the range that the adjustment rod 17 is able to displace inside the long tilt-adjustment holes 18 and the long telescopic-adjustment holes 23. By tilting the adjustment lever in a direction opposite the specified direction (typically upward) after adjustment, the space between the pair of pressure sections is contracted, and by the friction force increasing, the steering wheel 1 is maintained at the adjusted position.

The steering device also includes a shock-absorbing mechanism that allows the steering wheel 1 to displace forward in order to lessen the impact load that is applied to the operator when a secondary collision in which the operator's body collides with the steering wheel 1 during a collision accident occurs. This shock-absorbing mechanism is constructed by supporting the support bracket 15 with respect to the vehicle body 14 so as to be able to detach forward due to impact during a secondary collision.

When adjusting the forward-backward position of the steering wheel 1 in the case of a steering device that includes a telescopic mechanism and shock-absorbing mechanism, when the steering wheel 1 is vigorously made to displace to the very front position, and the rear-end sections of the long telescopic-adjustment holes 23 are made to forcibly hit the outer-circumferential surface of the adjustment rod 17, an impact in the same direction of the impact during a secondary collision is applied to the support bracket 15 by way of the adjustment rod 17.

In order to make it possible to further lessen the impact load that is applied to the operator during a secondary collision, reducing the support strength of the support bracket 15 with respect to the vehicle body 14 is thought possible. However, when this support strength is simply reduced and the steering wheel 1 is vigorously made to displace to the front-end position when adjusting the forward-backward position of the steering wheel 1, looseness occurs in the portion where the support bracket 15 is supported with respect to the vehicle body due to the impact that is applied to the support bracket 15, and there is a possibility that the operator will feel uncomfortable when operating the steering wheel 1. Therefore, together with lessening the impact load during a secondary collision, in order to prevent the occurrence of looseness in the support portion of the support bracket 15 when the steering wheel 1 is vigorously displaced to the front-end position when adjusting the forward-backward position of the steering wheel 1, achieving construction of a steering device that is capable of preventing impact going forward being applied to the support bracket 15 is desired.

RELATED LITERATURE

Patent Literature

[Patent Literature 1] JP2012086588 (A)
[Patent Literature 2] JP2013018472 (A)

SUMMARY OF INVENTION

Problems to be Solved by Invention

Taking into consideration the situation described above, the object of the present invention is to provide a steering device that is able to prevent impact going forward being applied to the support bracket when adjusting the forward-backward position of the steering wheel, even when the steering wheel is vigorously caused to displace to the front-end position.

Means for Solving Problems

The steering device of the present invention includes a steering column, a pair of held sections, a pair of long telescopic-adjustment holes, a support bracket, a pair of vehicle-side through holes, an adjustment rod, a pair of pressure sections, an expansion/contraction device, a cam member, a fastening member, and a stopper member.

The steering column has an inner column and an outer column, and is constructed by fitting together the rear section of the inner column with the front section of the outer column so that relative displacement in the axial direction is possible. An extendable/contractible steering shaft is rotatably supported on the inside of the steering column.

The pair of held sections are integrally provided with the outer column at two locations on the top surface or the bottom surface of the outer column that are separated in the width direction.

The pair of long telescopic-adjustment holes are provided in portions of the pair of held sections that are aligned with each other, and extend in the axial direction of the outer column.

The support bracket has a pair of left and right support-plate sections that sandwich the pair of held sections from both sides in the width direction, and is supported by the vehicle body so as to be able to detach forward due to a load that is applied during a secondary collision.

The pair of vehicle-side through holes are provided in portions of the pair of support-plate sections that are aligned with each other.

The adjustment rod is provided so as to pass in the width direction through the pair of vehicle-side through holes and the pair of long telescopic-adjustment holes.

The pair of pressure sections are provided on portions of both end sections of the adjustment rod that protrude from the outside surfaces of the pair of support-plate sections.

The expansion/contraction device expands or contracts the space between the pair of pressure sections.

The cam member is fastened to a portion of the adjustment rod that is located between the pair of held sections in the middle section in the axial direction of the adjustment rod.

The fastening member is provided such that the forward-backward position with respect to the vehicle body is regulated. Preferably, the fastening member is fastened to the inner column.

The stopper member, when supported by the fastening member, has a stopper surface that faces toward the rear, and when supported by the fastening member, has one side surface in the up-down direction that faces the outside surface of the steering column, and that one side surface in the up-down direction comes in contact with the outer-circumferential surface of the cam member.

The stopper member is constructed so that in the state in which the space between the pressure sections is expanded by the expansion/contraction device, the stopper surface is displaced toward the steering column side by the cam member, and when the outer column is displaced forward, the stopper surface hits a portion that displaces forward together with the outer column before the rear-end sections of the pair of long telescopic-adjustment holes hit the outer-circumferential surface of the adjustment rod, and in the state in which the space between the pair of pressure sections is contracted by the expansion/contraction device, the stopper surface is displaced in a direction going away from the steering column by the cam member, and even when the outer column displaces forward, the stopper surface does not hit the portion that displaces forward together with the outer column before the rear-end sections of the long telescopic-adjustment holes hit the outer-circumferential surface of the adjustment rod.

Preferably the outer column is provided with a slit that extends in the axial direction and is formed in the top section or the bottom section of the outer column so as to be able to expand and contract the diameter of the front section of the outer column, and the pair of held sections are integrally formed with the outer column at positions on the top surface or the bottom surface of the outer column that sandwich the slit from both sides in the width direction.

Preferably, the fastening member is located on the front side of the inner column; the stopper member includes a main stopper that has a front-end section and a rear-end surface, where the stopper surface is provided on the rear-end surface of the main stopper, and the front-end section of the main stopper is supported by the fastening member; and in a state in which the stopper surface hits the portion that displaces forward together with the outer column, the main stopper is held in the forward-backward direction between the portion that displaces forward together with the outer column and the fastening member.

The fastening member, for example, can be a housing that is connected to and fastened to the front-end section of the inner column and that houses the components of an electric-powered power steering device, a bracket for supporting the housing with respect to the vehicle-body, or a part of the vehicle body.

Preferably, the stopper member includes a lift section that is provided so as to extend toward the rear from a portion of the rear-end surface of the main stopper that is separated from the stopper surface, and the one side surface in the up-down direction of the stopper member is provided on the lift section; in which the lift section is constructed such that the one side surface in the up-down direction is pressed with a light force against the outer-circumferential direction of the cam member so as not to hinder displacement in the forward-backward direction of the outer column when adjusting the forward-backward position of the steering wheel. In this case, the cam member can be constructed so as to have a tip-end section at one point in the circumferential direction that has an oval shape when seen from the width direction and that protrudes an amount in the radial direction from the outer-circumferential surface of the adjustment rod more than any other portions. The cam member is constructed such that, in case that the cam member is located at the top of the steering column, when the space between the pair of pressure sections is contracted, the tip-end section of the cam member faces upward or diagonally upward, and when the space between the pressure sections is expanded, the tip-end section of the cam member faces downward or in the forward-backward direction; or in case that the cam member is located at the bottom of the steering column, when the space between the pair of pressure sections is contracted, the tip-end section of the cam member faces downward or diagonally downward, and when the space between the pressure sections is expanded, the tip-end section of the cam member faces upward or in the forward-backward direction.

Preferably, the stopper member has a bias means, and the stopper member is pressed in the up-down direction toward the steering column side by the bias means. Moreover, the stopper member can be supported by a stopper pivot shaft that is arranged in the width direction so as to be able to pivot with respect to the fastening member, and the stopper member is pressed by the bias means in a direction so as tilt centered around the stopper pivot shaft toward the steering column side. The bias means can be an elastic member that is provided between the stopper member and the fastening member. The elastic member can be integrally provided with the stopper member, or can be provided separate from the stopper member.

The stopper pivot shaft is preferably constructed so that when fastened to one member of the stopper member and the fastening member, the stopper pivot shaft is passed through a pivot shaft though hole that is formed in the other member of the stopper member and the fastening member, and so that even in a state in which the portion that displaces forward together with the outer column hits the stopper surface, the outers-circumferential surface of the stopper pivot shaft is not strongly pressed against the inner-circumferential surface of the pivot shaft through hole.

Preferably, the stopper member has a shock-absorbing section that elastically deforms a lot compared to other portions of the stopper member when at least one impact is applied of the impact that is applied when the portion that displaces forward together with the outer column hits the stopper surface, and the impact that is applied when the cam member and the stopper member hit during a secondary collision.

Effect of Invention

With the steering device of the present invention, even when the steering wheel is vigorously displaced to the front-end position when adjusting the forward-backward position of the steering wheel, it is possible to prevent an impact going forward from being applied to the support bracket. When the outer column is displaced forward by displacing the steering wheel in a state in which the space between the pair of pressure sections is expanded in order to make it possible to adjust the forward-backward position of the steering wheel, the portion that displaces forward together with the outer column hits the stopper surface of the stopper member before the rear-end sections of the pair of telescopic-adjustment holes hit the outer-circumferential surface of the adjustment rod. In other words, the rear-end sections of the pair of long telescopic-adjustment holes are prevented from hitting the outer-circumferential surface of the adjustment rod by the portion that displaces forward together with the outer column hitting the stopper surface. In the state in which the portion that displaces forward together with the steering column has hit the stopper surface, the force going forward that is applied to the outer column is supported by the vehicle body by way of the stopper member and the fastening member. Therefore, even when the steering wheel is vigorously displaced to the front-end position when adjusting the forward-backward position of the steering wheel, it is possible to prevent the force going forward that is applied to the outer column from being applied to the support bracket by way of the adjustment rod, and it is possible to prevent impact going forward from being applied to the support bracket.

The collision between the portion that displaces forward together with the outer column and the stopper surface of the stopper member when the outer column is displaced forward occurs only when the space between the pair of pressure sections is expanded by the expansion/contraction device. In other words, even when the outer column is displaced forward by an impact load during a secondary collision in a state of operation when a secondary collision can occur, or in other words in a state in which the space between the pair of pressure sections is contracted by the expansion/contraction device and the steering wheel is maintained at the adjusted position, the portion that displaces forward together with the outer column does not hit the stopper surface of the stopper member, and the rear-end sections of the pair of long telescopic-adjustment holes are allowed to hit the outer-circumferential surface of the adjustment rod. Therefore, it is possible for the impact load during a secondary collision to be transmitted to the support bracket by way of the adjustment rod, which causes the support bracket to detach (displace) forward with respect to the vehicle body, making it possible to lessen the impact load on the operator.

The steering device of the present invention is constructed so that even when the steering wheel is vigorously displaced to the front-end position when adjusting the forward-backward position of the steering wheel, impact going forward is not applied to the support bracket. In other words, when setting the support strength of the support bracket with respect to the vehicle body, it is not necessary to take into consideration an impact load going forward that is applied to the support bracket when adjusting the forward-backward position of the steering wheel, and thus designing the support strength can be simplified, and it is easy to lessen the impact load that is applied to the operator during a secondary collision.

MODES FOR CARRYING OUT INVENTION

Figure 1:
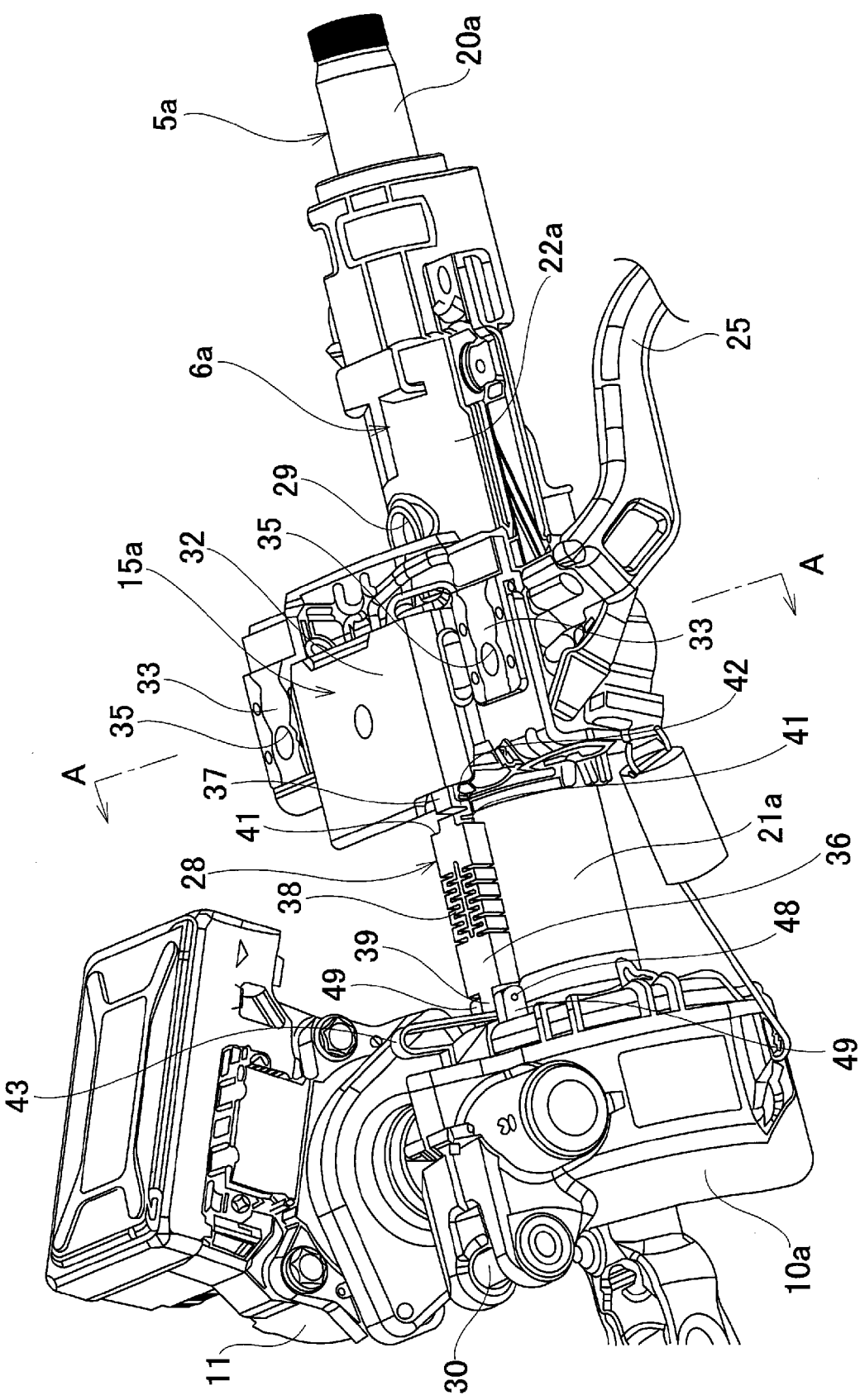
FIG. 1 is a perspective view illustrating an example of an embodiment of the present invention.
Figure 2:
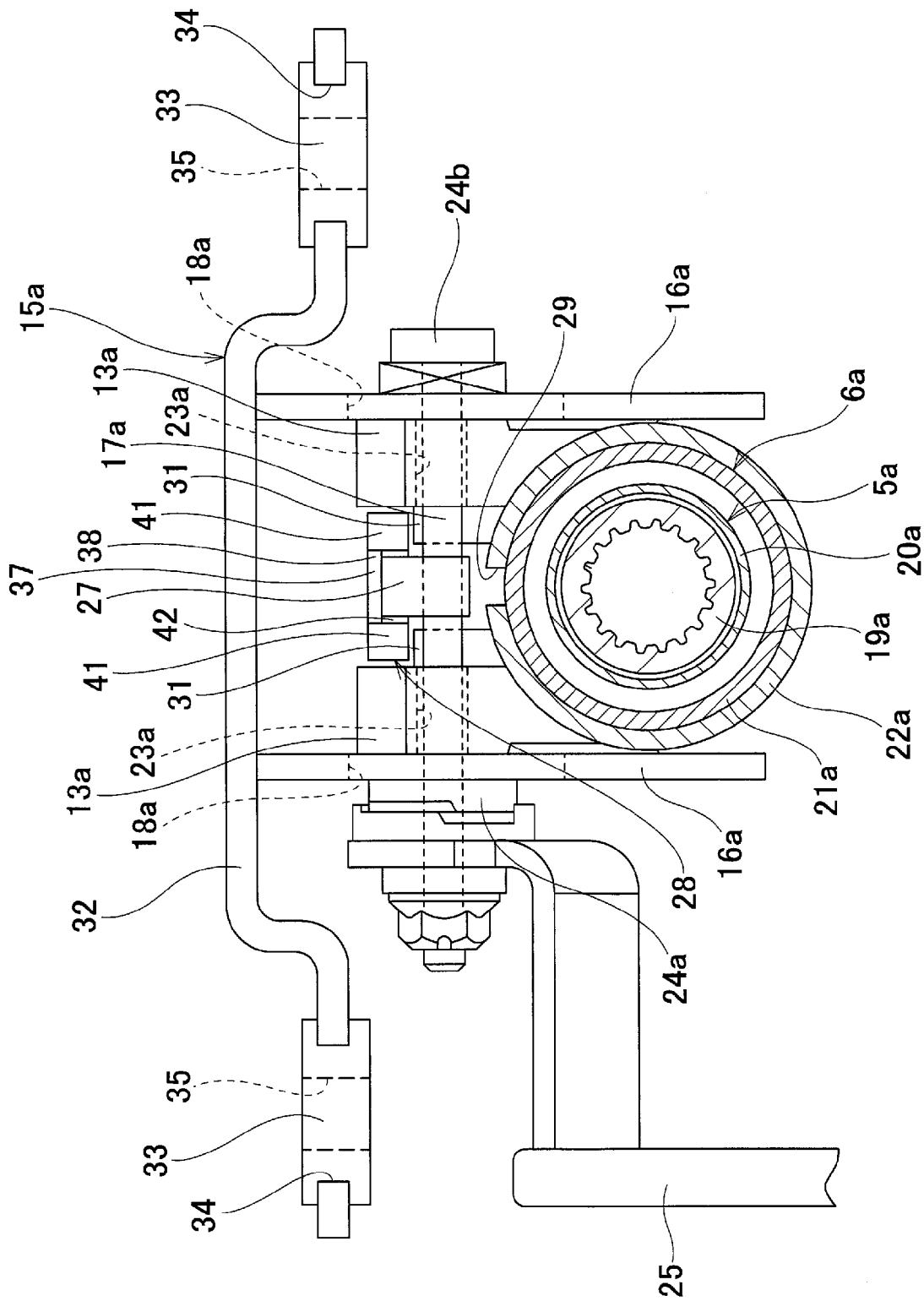
FIG. 2 is an enlarged cross-sectional view of section A-A in FIG. 1, where some of the parts are omitted or simplified.
Figure 3:
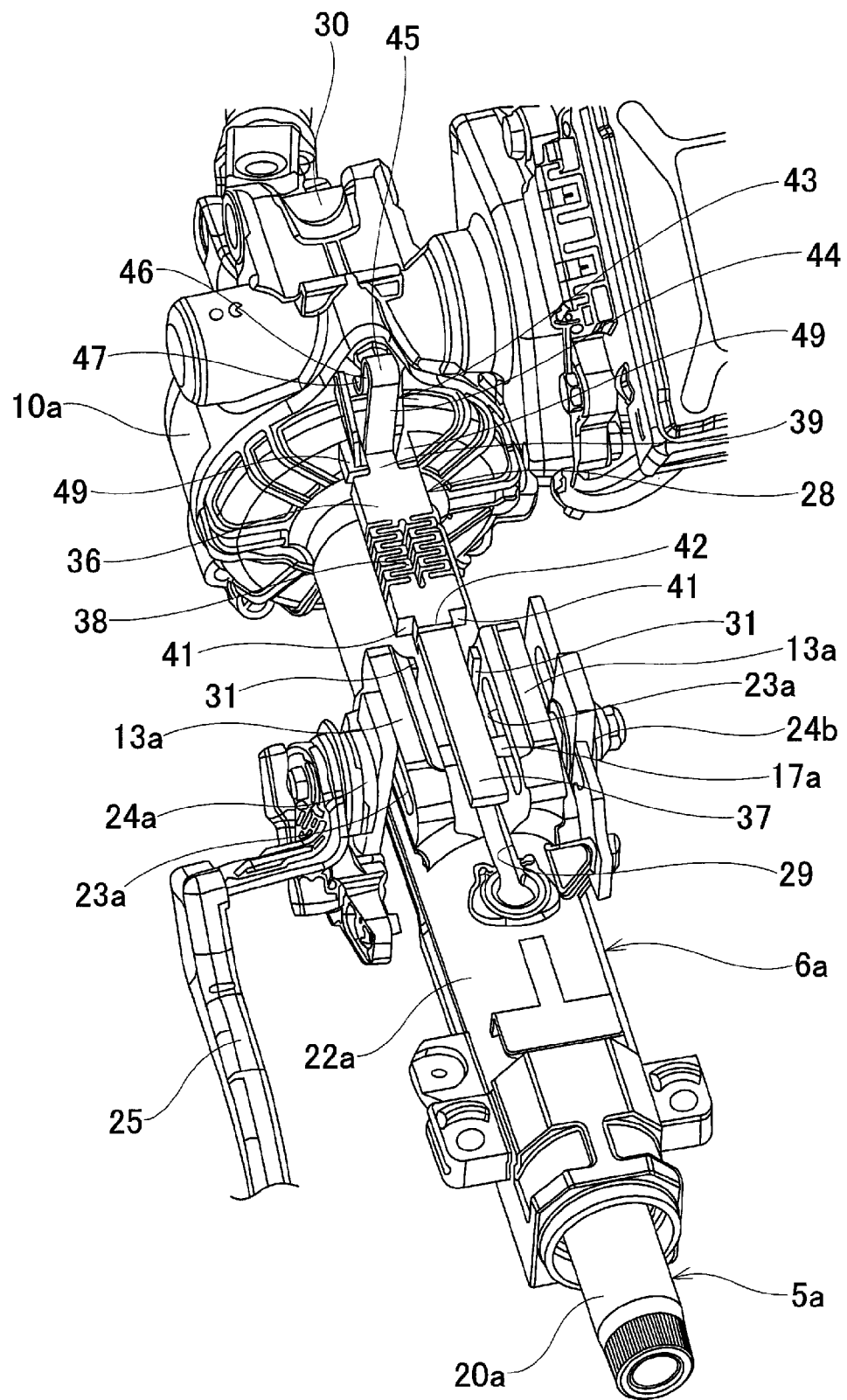
FIG. 3 is a perspective view of an embodiment of the present invention as seen from above with some of the parts, including the support bracket, removed.

FIG. 1 to FIG. 9 illustrate an example of an embodiment of the present invention. The steering device includes a steering column 6a, a pair of held sections 13a, a pair of long telescopic-adjustment holes 23a, a steering shaft 5a, a support bracket 15a, a pair of long tilt-adjustment holes 18a that are a pair of through holes on the vehicle body side, an adjustment rod 17a, a pair of pressure sections 24a, 24b, an expansion/contraction device, a cam member 27 and a stopper member 28.

The steering column 6a is made of a metal such a iron-based alloy or an aluminum alloy, and has a cylindrical shaped inner column 21a and a cylindrical shaped outer column 22a, and is constructed by fitting together the rear section of the inner column 21a that is located on the front side and the front section of the outer column 22a that is located on the rear side so as to be able to displace in the axial direction. Preferably, a slit 29 that extends in the axial direction is provided in the top section or bottom section (top section in the example in the figures) of the outer column 22a, and the outer column 22a is constructed such that the diameter of the front section of the outer column 22a can elastically expand or contract. A housing 10a that is made of a metal such as an iron-based alloy or aluminum alloy, or made of a synthetic resin is connected and fastened to the front-end section of the inner column 21a. A speed reducer, torque measurement device and the like, which are components of an electric-powered power steering device, are housed in the housing 10a, and an electric motor 11, which is the power source of this electric-powered power steering device, is supported by the housing 10a. The housing 10a is supported by the vehicle body by tilt pivot shaft such as a bolt or the like that is inserted into a support tube 30 is arranged in the width direction at the upper front end of the housing 10a. The housing 10a and inner column 21a, when installed in the vehicle, are such that the forward-backward position with respect to the vehicle body is regulated. In the example in the figures, the housing 10a corresponds to a fastening member of the present invention. Known and arbitrary construction can be used for the fastening member in which the fastening member can be fastened to the inner column 21a, and with the forward-backward position with respect to the vehicle body of the fastening member together with the inner column 21 regulated, can be supported by the vehicle body.

The pair of held sections 13a are integrally formed with the outer column 22a at two positions in the width direction on the top surface of the front section of the outer column 22a on both sides in the width direction of the slit 29.

The pair of long telescopic-adjustment holes 23a are provided at positions in the pair of held sections 13a that are aligned with each other, and extend in the axial direction of the outer column 22a.

Figure 10:
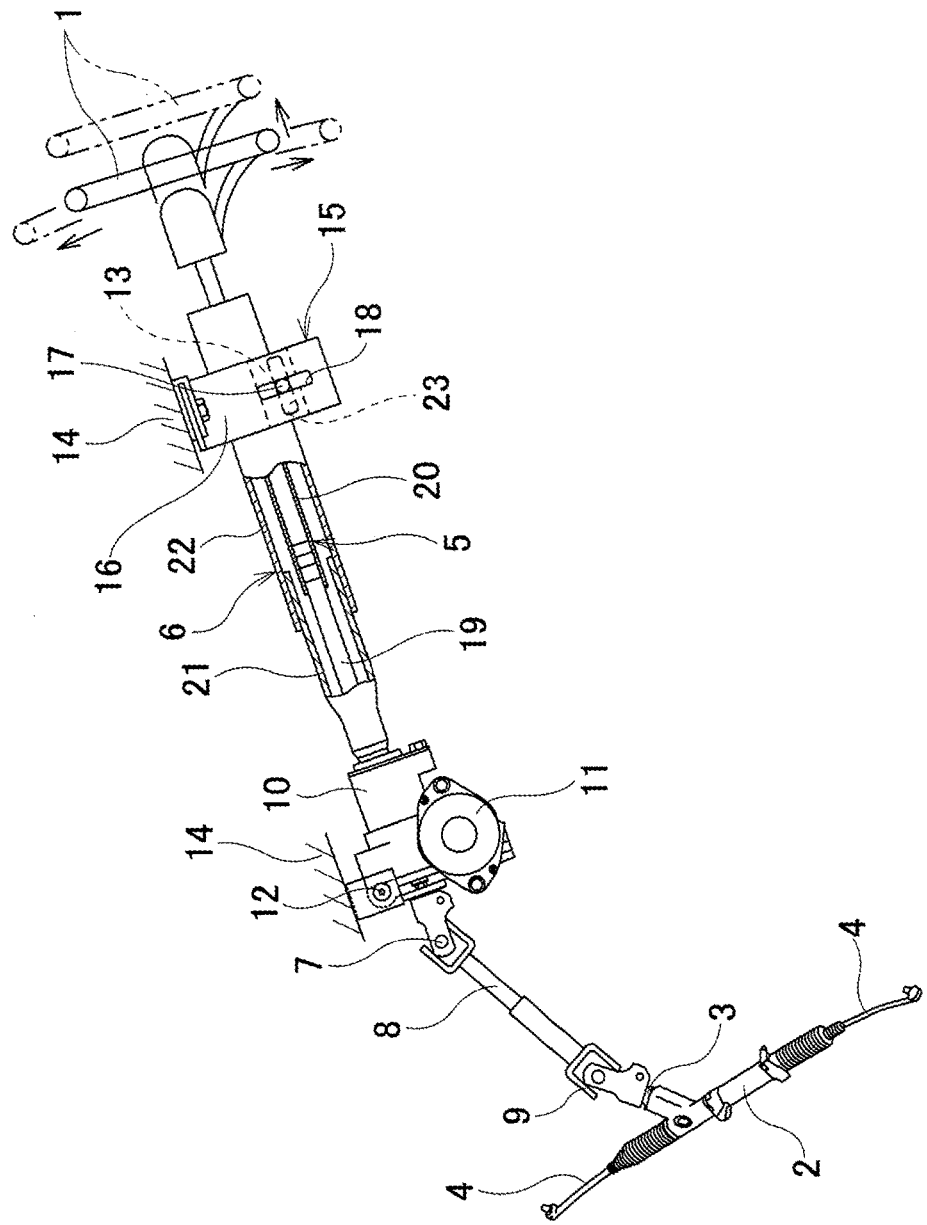
FIG. 10 is a partial cross-sectional side view illustrating an example of a steering device having conventional construction.

A pair of stopper pieces 31 are provided in part of portions of the inside surfaces of the pair of held sections 13a that are located further on the front side than the pair of long telescopic-adjustment holes 23a (from the bottom-end section to the middle section in the example shown in the figures) and protrude toward the inside in the width direction. The bottom-end sections of the pair of stopper pieces 31 are connected to the top surface of the outer column 22a, and displace forward together with the outer column 22a when adjusting the forward-backward position of the steering wheel 1 (see FIG. 10) or during a secondary collision. In other words, the pair of stopper pieces 31 correspond to portions that displace forward together with the outer column of the present invention.

The steering shaft 5a has construction in which the rear section of an inner shaft 19a that is located on the front side and the front section of an outer shaft 20a that is located on the rear side are fitted together by a non-circular fit such as a spline fit such that transmission of torque is possible and so that displacement in the axial direction is possible, and this steering shaft 5a is supported on the inside of the steering column 6a so as to rotate freely. The inner shaft 19a is supported on the inside of the inner column 21a by a rolling bearing such as a single-row deep-groove ball bearing that is capable of supporting radial loads and thrust loads, and is supported so as only to be able to rotate. The outer shaft 20a is supported on the inside of the outer column 22a by a rolling bearing such as a single-row deep-groove ball bearing that is capable of supporting radial loads and thrust loads, and is supported so as only to be able to rotate. Therefore, the steering shaft 5a expands or contracts as the steering column 6a expands or contracts. A steering wheel 1 is supported by and fastened to the portion of the rear-end section of the outer shaft 20a that protrudes out rearward further than an opening on the rear end of the outer column 22a.

The support bracket 15a has an installation-plate section 32 that is supported by the vehicle body so as to be able to detach (displace) forward due to an impact load that is applied during a secondary collision, and a pair of support-plate sections 16a that are parallel with each other and are provided so as to hang down from the bottom surface of the installation-plate section 32. The installation-plate section 32 has a pair of locking notches 34 that are formed on both end sections in the width direction of the installation-plate section 32, and these locking notches 34 open up to the rear-end edge of the installation-plate section 32. The pair of support-plate sections 16a are located in positions that sandwich the pair of held sections 13a from both sides in the width direction. The support bracket 15a is supported by the vehicle body so as to be able to normally support the steering column 6a before a secondary collision occurs, and when a secondary collision occurs, is able to detach forward due to an impact load due to that secondary collision. A pair of locking members 33 have a pair of through holes 35 that are formed in the center section in the width direction of the pair of locking members 33, and are fastened to the vehicle body by a pair of bolts or studs that are inserted though the pair of through holes 35, and the pair of locking notches 34 are locked with the pair of locking members 33. When a secondary collision occurs and an impact load going forward is applied to the support bracket 15*a*, the pair of locking members 33 come out toward the rear from the pair of locking notches 34, which allows the support bracket 15*a* to detach forward with respect to the vehicle body. The load required for the support bracket 15*a* to detach forward, or in other words, the support strength of the support bracket 15*a* with respect to the vehicle body, can be adjusted, for example, by changing the friction force that acts in the engaging sections between the pair of locking notches 34 and the pair of locking members 33. When resin pins that can be torn off when the support bracket 15*a* detaches forward are provided so as to span between the support bracket 15*a* and the pair of locking members 33, the support strength of the support bracket 15*a* with respect to the vehicle body can also be adjusted by changing the number, diameter, material and the like of the pins. When a shock-absorbing member that is made of a metal that plastically deforms due to detachment of the support bracket 15*a* toward the front is provided so as to span between the support bracket 15*a* and the pair of locking members 33, it is also possible to adjust the support strength of the support bracket 15*a* with respect to the vehicle body by changing the shape or material of the shock-absorbing member.

The pair of long tilt-adjustment holes 18*a* are formed into circular arc shapes centered around the tilt pivot shaft this is passed through the support tube 30 in portions of the pair of support-plate sections 16*a* that are aligned with each other, and extend in the up-down direction. The pair of long tilt-adjustment holes 18*a* can also be formed in the tangential direction of circular arcs centered around the tilt pivot shaft, and extend in the up-down direction.

The adjustment rod 17*a* is arranged so as to pass in the width direction through the pair of long telescopic-adjustment holes 23*a* and pair of long tilt-adjustment holes 18*a*.

The pair of pressure sections 24*a*, 24*b* are provided in portions on both end sections of the adjustment rod 17*a* that protrude out from the outside surfaces of the pair of support-plate sections 16*a*.

The expansion/contraction device is constructed so as to expand or contract the space between the pair of pressure sections 24*a*, 24*b* as an adjustment lever 25 that is provided on one end section of the adjustment rod 17*a* is rotated. As this expansion/contraction device, it is possible to use, for example, a cam device that includes a drive-side cam and a driven-side cam, or a screw device that includes a bolt and nut.

The cam member 27 is fastened around and onto a portion of the adjustment rod 17*a* that is located in the middle section in the axial direction of the adjustment rod 17*a* and between the pair of held sections 13*a*, has an oval shape when seen from the width direction, and has a tip-end section at one location in the circumferential direction of which the amount protruding in the radial direction from the outer-circumferential surface of the adjustment rod 17*a* is greater than the other portions. The shape of the cam member 27 is not limited to an oval shape as illustrated in the figure. For example, the cam member 27 can be a pin section that is provided at one location in the circumferential direction that protrudes outward in the radial direction, and that pin section can function as the tip-end section of which the amount protruding in the radial direction from the outer-circumferential surface of the adjustment rod 17*a* is greater than the other portions. In the example in the figures, the tip-end section of the cam member 27 faces diagonally upward toward the rear when the adjustment lever 25 is rotated upward to the position illustrated in FIG. 4 and FIG. 5 to a state in which the steering wheel 1 is held in the adjusted position, and faces toward the rear when the adjustment lever 25 is rotated downward to the position illustrated in FIG. 6 and FIG. 7 to a state in which the position of the steering wheel 1 can be adjusted.

In the example in the figures, the stopper member 28 is integrally made of synthetic resin so that the entire body is a single unit, and includes a main stopper 36 that is located on the front side, and a lift section 37 that is located on the rear side, and is provided in a position that faces the top surface of the front half section of the steering column 6*a*.

The main stopper 36 has a rectangular plate shape that extends in the forward-backward direction nearly parallel with the center axis of the steering column 6*a*, and has a first shock-absorbing section 38, a narrow width section 39, a first through hole 40, and a pair of stopper surfaces 41. The first shock-absorbing section 38 is provided in the middle section in the lengthwise direction of the main stopper 36 by forming plural cut-out sections in the middle section in the width direction and in both end sections in the width direction of the middle section in the lengthwise direction of the main stopper 36 that pass through in the up-down direction, or together with passing through in the up-down direction are open on both side surfaces in the width direction, and when compared with the other portions of the main stopper 36, easily undergoes elastic compressive deformation in the lengthwise direction. The narrow width section 39 is provided on the front-end section of the main stopper 36, and the width dimension is narrower than the portion adjacent to the rear side. The first through hole 40 has a circular cross section, and is provided in the width direction in the narrow width section 39. The pair of stopper surfaces 41 are provided on both end sections in the width direction of the rear-end surface of the main stopper 36, and are arranged on the same virtual plane that is orthogonal to the lengthwise direction of the main stopper 36.

The lift section 37 is provided so as to extend outward toward the rear from the center portion in the width direction of the rear-end surface of the main stopper 36, which is the portion between the pair of stopper surfaces 41. The lift section 37 has a second shock-absorbing section 42. The second shock-absorbing section 42 is formed in a wave shape in the up-down direction, and compared to the other portion of the lift section 37 and the portions other than the first shock-absorbing section 38 of the main stopper 36, easily undergoes elastic compressive deformation. Of the lift section 37, the portion other than the second shock-absorbing section 42 has a rectangular plate shape and is provided so as to extend toward the rear from the top-end section of the rear-end surface of the second shock-absorbing section 42.

In the example in the figures, a bias spring 43, which is a plate spring that is made of the same kind of synthetic resin as the stopper member 28 is integrally provided with the stopper member 28 on the very front section of the narrow width section 39 of the front-end section of the stopper member 28. The bias spring 43 has a rectangular plate shaped standing plate section 44 that is provided so as to bend upward at a right angle from the very front section of the narrow width section 39, a bent-back plate section 45 having a semi arc plate shape that is bent back 180° toward the front from the top-end section of the standing plate section 44, a hanging plate section 46 that has a rectangular plate shape that hangs down from the front-end section of the bent-back plate section 45, and a projecting plate section 47 that has a rectangular plate shape and is provided so as to bend at a right angle toward the front from the bottom-end section of the hanging plate section 46.

In the example in the figures, a pair of projecting fastening plates 49 that are parallel with each other and separated from each other in the width direction are provided in portions on the rear-end surface of the housing 10*a*. A pair of second through holes 50 that have a circular cross-sectional shape are provided concentric with each other in portions of the pair of fastening plates 49 that are aligned with each other. The front-end section of the stopper member 28 is pivotally supported by the rear-end section of the housing 10*a* by arranging the narrow width section 39 in the portion between the pair of fastening plates 49, and installing a pin 48, which is a stopper pivot pin, so as to span through the first through hole 40 that is provided in the narrow width section 39, and the pair of second through holes 50. More specifically, as illustrated in FIG. 8A, both end section of the pin 48 are fastened inside the pair of second through holes 50 by a pressure fit, and the middle section of the pin 48 is loosely passed through the first through hole 40, which is a through hole for the pivot shaft. Alternatively, as illustrated in FIG. 8B, the middle section of the pin 48 is fastened on the inside of the first through hole 40 with a pressure fit, and both end sections of the pin 48 are loosely inserted into the pair of second through holes 50, which are both through holes for the pivot shaft. In the case of employing the construction illustrated in FIG. 8B, the pin 48 is integrally provided with the stopper member 28, or in other words, the stopper member 28 can be made of a synthetic resin. In either case, the outer diameter of the pin 48 or the inner diameter of the first through hole 40 or the inner diameters of the pair of second through holes 50 are regulated so that when the front-end surface of the stopper member 28 hits against the rear-end surface of the housing 10*a*, the outer-circumferential surface of the pin 48 is not strongly pressed against the inner-circumferential surface of the first through hole 40 or the pair of second through holes 50 which is (are) the through hole(s) for the pivot shaft.

With the front-end section of the stopper member 28 pivotally supported by the pin 48, the bottom surface of the lift section 37 is pressed with a light force against the outer-circumferential surface of the cam member 27, and the front-end section of the projecting plate section 47 of the bias spring 43 is pressed against the top-end section of the rear-end surface of the housing 10*a* due to the tensile force of the bias spring 43. The pressing force due to the tensile force of the bias spring 43 is converted to a force that causes the stopper member 28 to tilt centered around the pin 48 toward the steering column 6*a* side, and the bottom surface of the lift section 37 is elastically pressed against the outer-circumferential surface of the cam member 27. With the lift section 37 elastically pressed against the outer-circumferential surface of the cam member 27, the tensile force of the second shock-absorbing member 42 of the stopper member 28 also acts as a force that elastically presses the bottom surface of the lift section 37 against the outer-circumferential surface of the cam member 27. By elastically pressing the bottom surface of the lift section 37 against the outer-circumferential surface of the cam member 27, the ability of the bottom surface of the lift section 37 to follow the outer-circumferential surface of the cam member 27 becomes good. However, when adjusting the forward-backward position of the steering wheel 1, the force that elastically presses the bottom surface of the lift section 37 against the outer-circumferential surface of the cam member 27 becomes small enough that displacement in the forward-backward direction of the outer column 22*a* is not hindered. In the example in the figures, the bias spring 43 is integrally formed with the stopper member 28, so it is possible to reduce costs and improve assembly due to the reduced number of parts.

Figure 4:
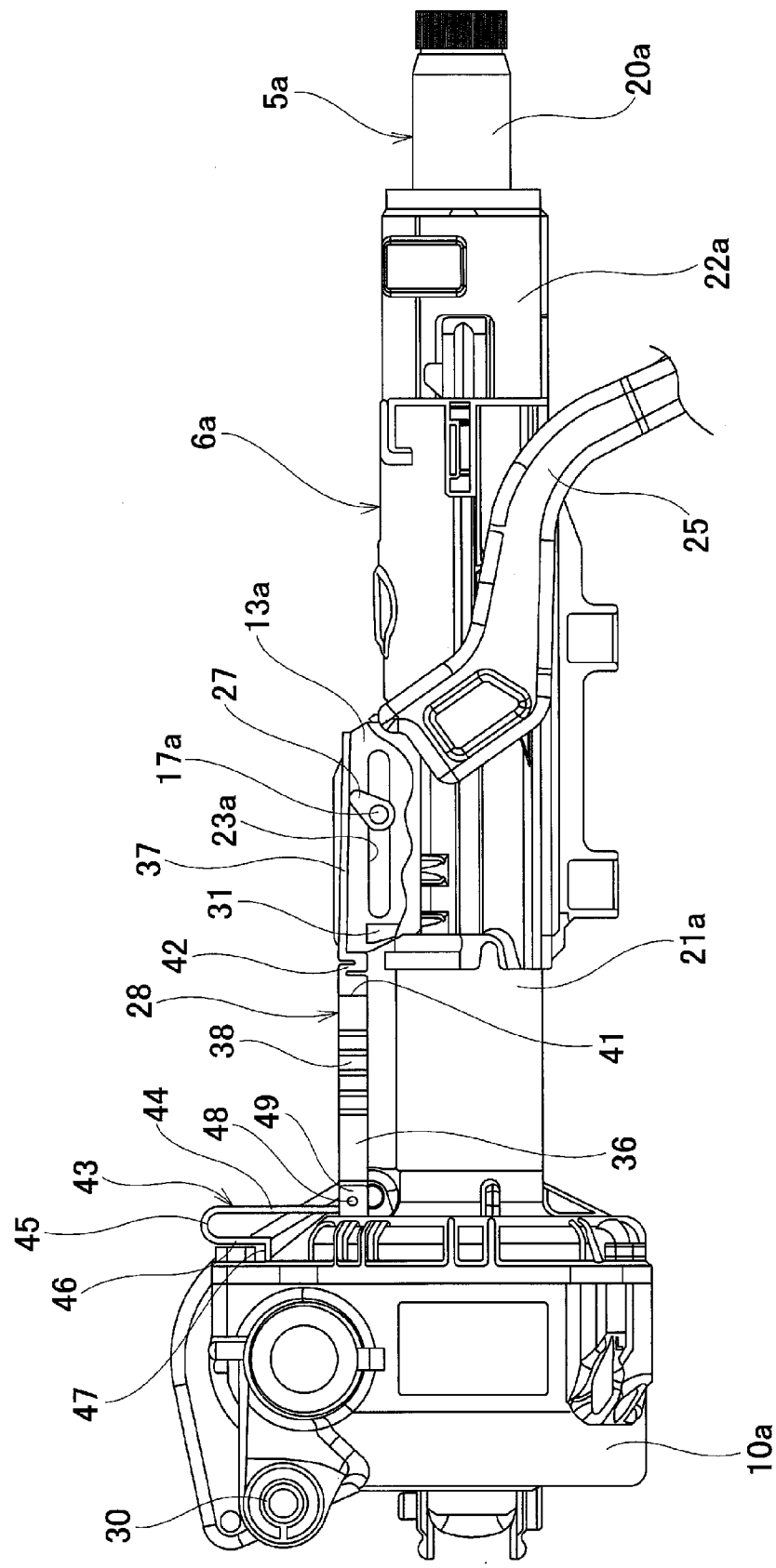
FIG. 4 is a partial cross-sectional side view of an example of an embodiment of the present invention, and illustrates a state in which, together with some of the parts including the support bracket being removed, the adjustment lever is rotated in a direction that contracts the space between the pair of pressure sections.
Figure 5:
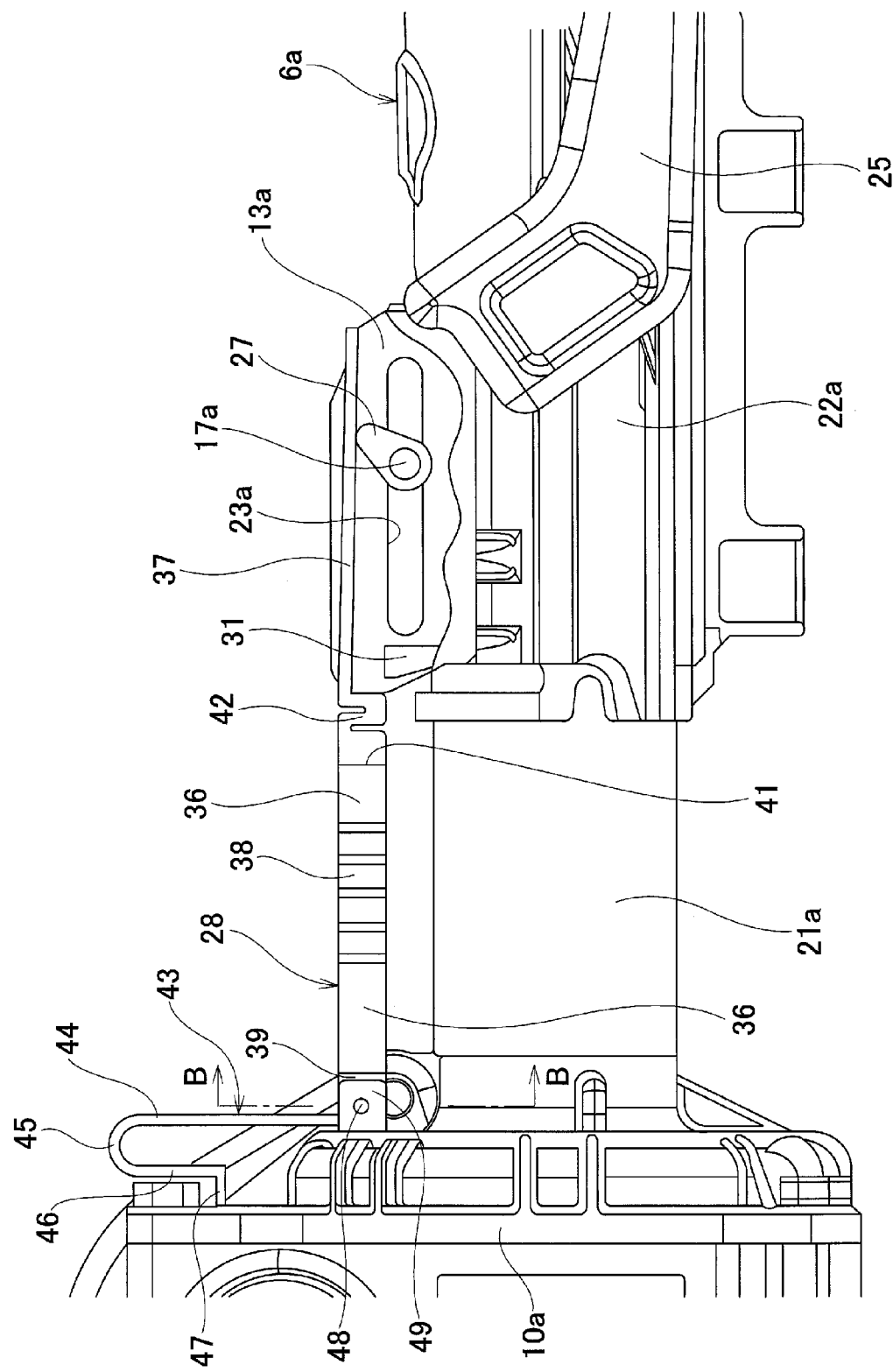
FIG. 5 is an enlarged view of the middle part of FIG. 4.
Figure 6:
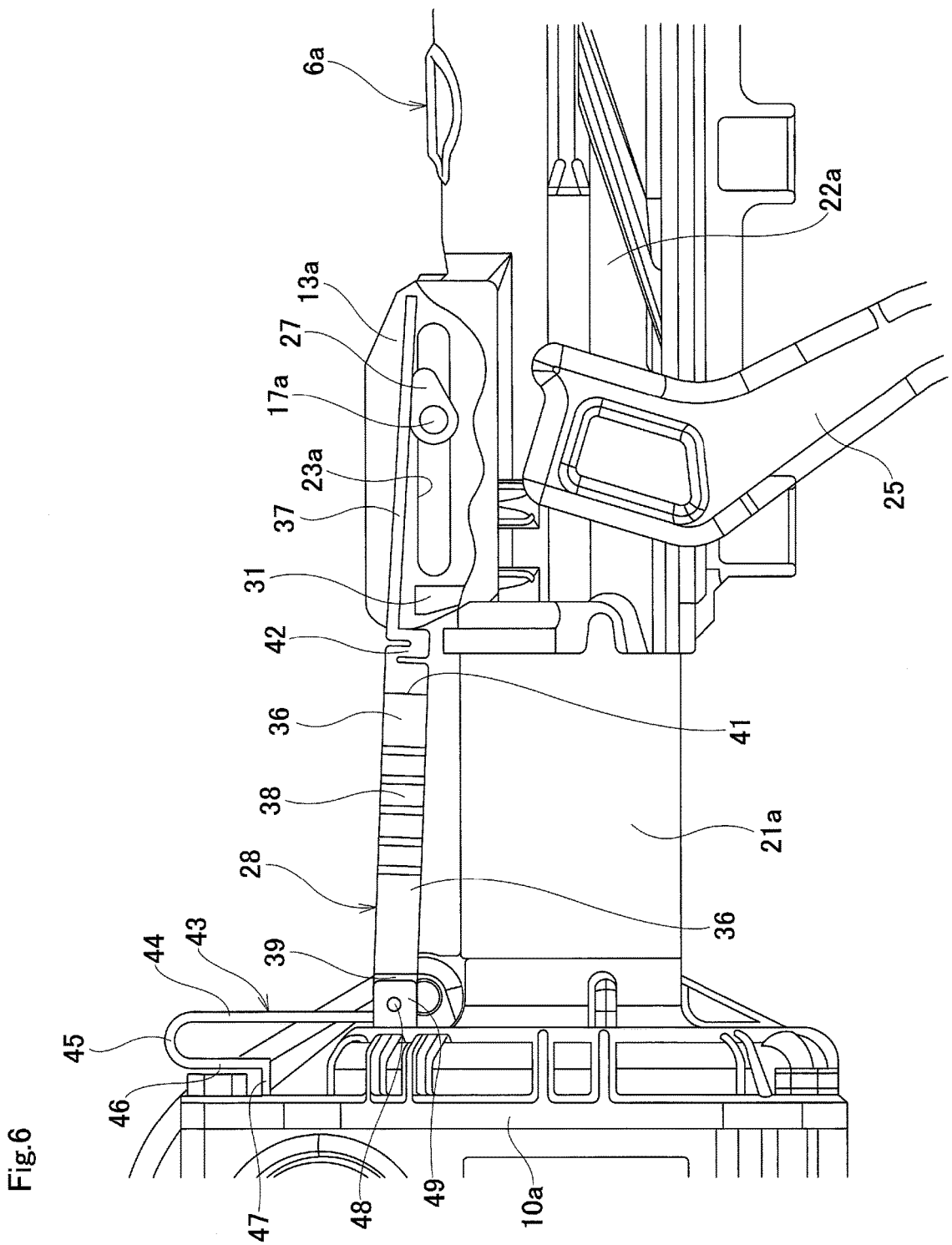
FIG. 6 is a view similar to FIG. 5 of an example of an embodiment of the present invention, and illustrates a state in which the adjustment lever is rotated in a direction that expands the space between the pair of pressure sections.
Figure 7:
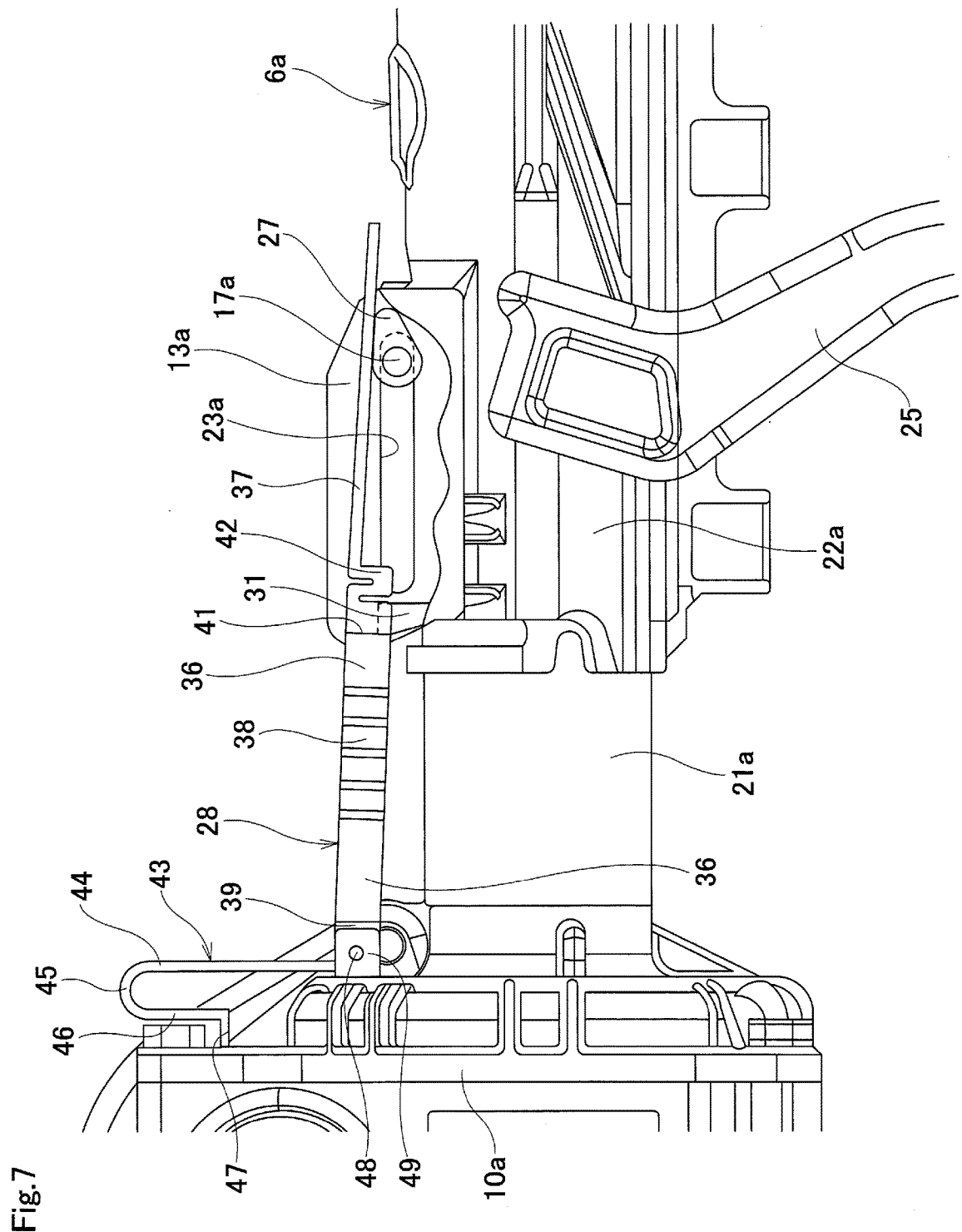
FIG. 7 is a view similar to FIG. 6 of an example of an embodiment of the present invention, and illustrates a state in which the outer column is made to displace to the front-end position where position adjustment is possible.
Figure 8:
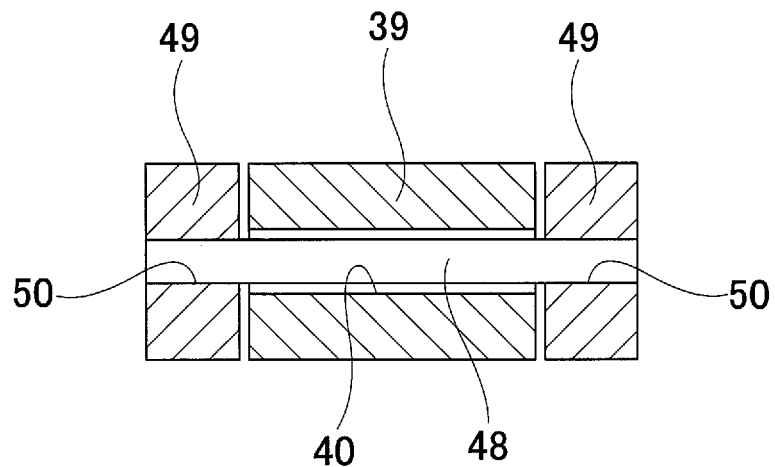
FIG. 8A and FIG. 8B are cross-sectional views of section B-B in FIG. 5.
Figure 8:
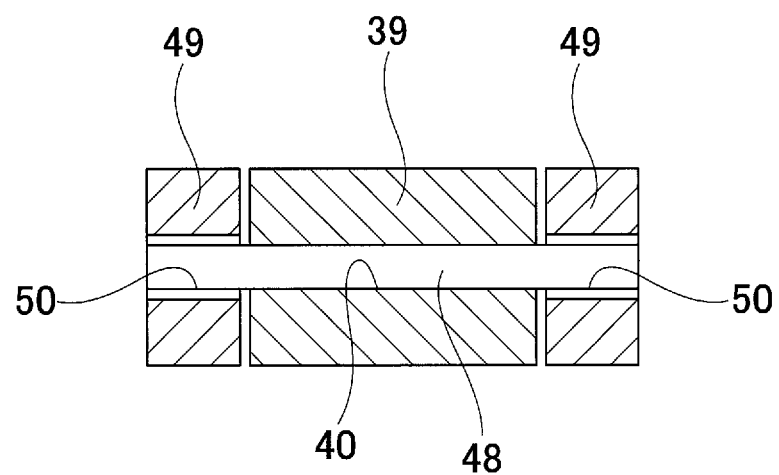
Figure 9:
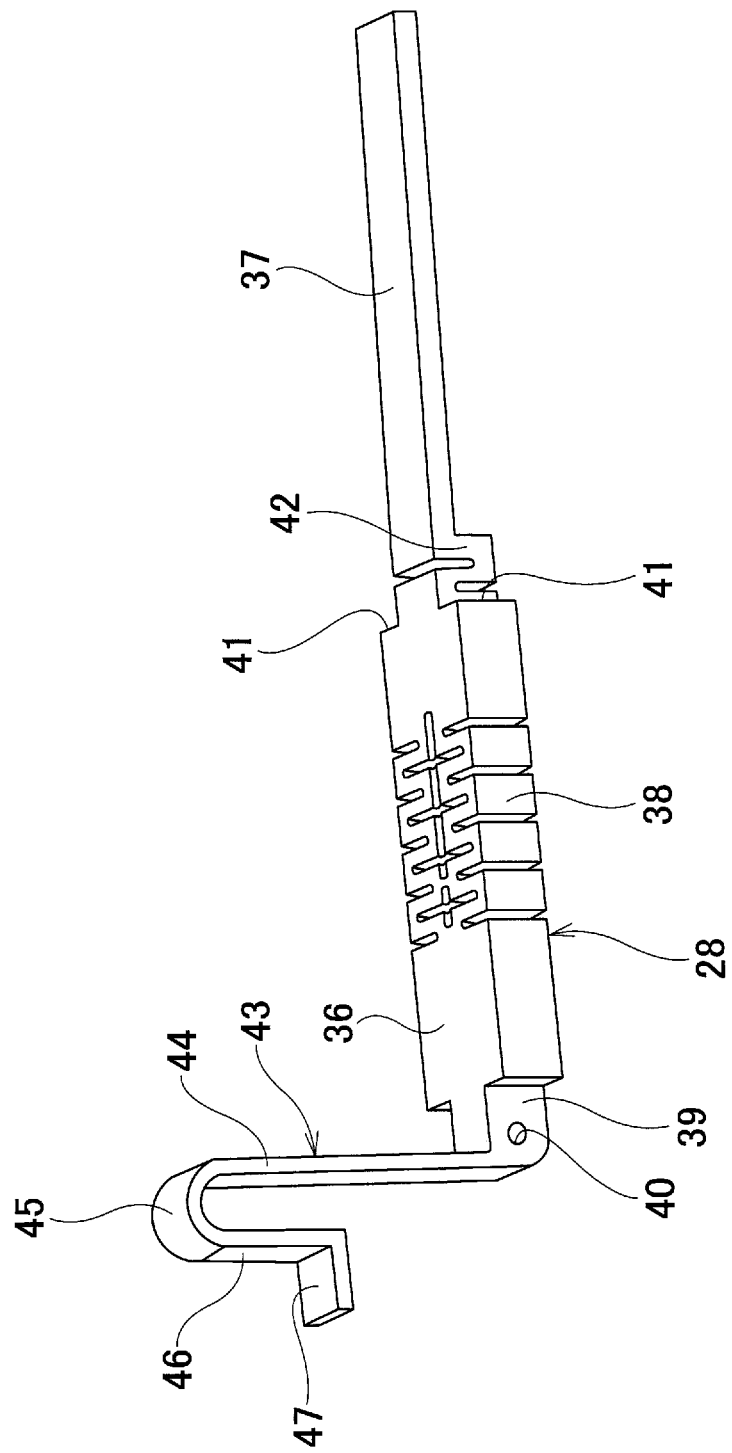
FIG. 9 is a perspective view of a stopper member that is applied to an example of an embodiment of the present invention.

By operating the expansion/contraction device by tilting the adjustment lever 25 downward from the position illustrated in FIG. 4 and FIG. 5 to the position illustrated in FIG. 6 and FIG. 7 when adjusting the up-down position or forward-backward position of the steering wheel, the space between the pair of pressure sections 24*a*, 24*b* (space in the left-right direction in FIG. 2) expands. As a result, the diameter of the front section of the outer cam 22*a* elastically expands, the surface pressure at the area of contact between the inner-circumferential surface on the front section of the outer column 22*a* and the outer-circumferential surface of the rear end of the inner column 21*a* decreases or is lost, and the surface pressure at the areas of contact between the inside surfaces of the pair of support-plate sections 16*a* and the outside surfaces of the pair of held sections 13*a* decreases or is lost. In this state, the position of the steering wheel 1 can be adjusted within the range that the adjustment rod 17*a* can displace inside the pair of long telescopic-adjustment holes 23*a* and the pair of long tilt-adjustment holes 18*a*. After adjustment, by operating the expansion/contraction device by tilting the adjustment lever 25 upward from the position illustrated in FIG. 6 and FIG. 7 to the position illustrated in FIG. 4 and FIG. 5, the space between the pair of pressure sections 24*a*, 24*b* is contracted. As a result, the surface pressure at the area of contact between the inner-circumferential surface of the front section of the outer column 22*a* and the outer-circumferential surface of the rear section of the inner column 21*a* becomes large, the surface pressure at the areas of contact between the inside surface of the pair of support-plate sections 16*a* and the outside surfaces of the pair of held sections 13*a* becomes large, and the steering wheel 1 is maintained at the adjusted position.

When the adjustment lever has been tilted downward to the position illustrated in FIG. 6 and FIG. 7, or in other words, in a state in which it is possible to adjust the position of the steering wheel, the tip-end section of the cam member 27 faces toward the rear. As a result, the lift section 37 of the stopper member 28 displaces downward and the pair of stopper surfaces 41 also displace downward. With the pair of stopper surfaces 41 displaced downward, at least the bottom-end section of the pair of stopper surfaces 41 faces at least the top-end section of the front end surfaces of the pair of stopper pieces 31 in the axial direction of the steering columns 6*a*, regardless of the forward-backward position of the steering wheel 1. When the outer column 22*a* is displaced forward with the pair of stopper surfaces 41 displaced downward, as illustrated in FIG. 7, before the rear-end sections of the pair of long telescopic-adjustment holes hits the outer-circumferential surface of the adjustment rod 17*a*, the front-end surfaces of the pair of stopper pieces 31 hit (come in contact with) the pair of stopper surfaces 41, and the main stopper 36 of the stopper member 28 is held in the forward-backward direction between the rear-end surface of the housing 10*a* and the front-end surfaces of the pair of stopper pieces 31. In other words, the positions where the front-end surfaces of the pair of stopper pieces 31 hit the pair of stopper surfaces 41 is the front-end position of the position adjustable range of the steering wheel 1.

In the state in which the adjustment lever 25 is tilted upward to the position illustrated in FIG. 4 and FIG. 5, or in other words, in a state in which the steering wheel 1 is maintained at the adjusted position, the tip-end section of the cam member 27 faces diagonally upward toward the rear. As a result, the lift section 37 of the stopper member 28 displaces upward, and the pair of stopper surfaces 41 also displace upward. In the state in which the pair of stopper surfaces 41 have displaced upward, the overall pair of stopper surfaces 41 are positioned further upward than the front-end surface of the pair of stopper pieces 31, or in other words, the pair of stopper surfaces 41 and the front-end surfaces of the pair of stopper pieces 31 do not face each other in the axial direction of the steering column 6a, regardless of the forward-backward position of the steering wheel 1.

In a steering device having this kind of construction, even when the steering wheel 1 is vigorously displaced to the front-end position when adjusting the forward-backward position of the steering wheel 1, it is possible to prevent impact going forward from being applied to the support bracket 15a. In other words, in a state in which in order for it to be possible to adjust the forward-backward position of the steering wheel 1, the adjustment lever 25 is tilted downward to the position illustrated in FIG. 6 and FIG. 7 and the space between the pair of pressure section 24a, 24b of the expansion/contraction device is expanded, when the outer column 22a is displaced forward by displacing the steering wheel 1, as illustrated in FIG. 7, before the rear-end sections of the pair of long telescopic-adjustment holes 23a hit the outer-circumferential surface of the adjustment rod 17a, the front-end surfaces of the pair of stopper pieces 31 hit (come in contact with) the pair of stopper surfaces 41, and the main stopper 36 is held in the forward-backward direction between the rear-end surface of the housing 10a and the front-end surfaces of the pair of stopper pieces 31, and the rear-end sections of the pair of long telescopic-adjustment holes 23a are prevented from hitting the outer-circumferential surface of the adjustment rod 17a. In the state in which the front-end surfaces of the pair of stopper pieces 31 have hit the pair of stopper surfaces 41, the force going forward that is applied to the outer column 22a from the steering wheel 1 is supported by the vehicle body by way of the main stopper 36 and the housing 10a. Therefore, even when the steering wheel 1 is vigorously displaced to the front-end position when adjusting the forward-backward position of the steering wheel 1, the force going forward that is applied to the outer column 22a from the steering wheel 1 is prevented from being transmitted to the supported bracket 15a by way of the adjustment rod 17a, and thus impact going forward being applied to the support bracket 15a is prevented.

In the example in the figures, the stopper member 28 includes a main stopper 36 that is located on the front side and a lift section 37 that is located on the rear side, and only the main stopper 36 is held in the forward-backward direction between the rear-end surface of the housing 10a and the front-end surfaces of the pair of stopper pieces 31. Therefore, when compared with the case of using construction in which the entire long stopper member 28 is held in the forward-backward direction between the rear-end surface of the housing 10a and the front-end surfaces of the pair of stopper pieces 31, it is possible to increase the buckling strength of the portion held in the forward-backward direction. The impact that occurs when the front-end surfaces of the pair of stopper pieces 31 hit the pair of stopper surfaces 41 is lessened by the first shock-absorbing section 38 of the main stopper 36 elastically compressing. Even in the state in which the main stopper 36 is held in the forward-backward direction between the rear-end surface of the housing 10a and the front-end surfaces of the pair of stopper pieces 31, or in other words, even in the state in which the front-end surface of the stopper member 28 comes in contact with the rear-end surface of the housing 10a, the outer-circumferential surface of the pin 48 is not strongly pressed against the inner-circumferential surface of the first through hole 40 or the second through holes 50, which is a through hole or though holes for the pivot shaft, so the pin 48 and pair of fastening plates 49 are prevented from being damaged.

In the state in which the adjustment lever 25 has been tilted upward to the position illustrated in FIG. 4 and FIG. 5 in order to maintain the steering wheel 1 at the adjusted position, and the space between the pair of pressure sections 24a, 24b has been contracted by the expansion/contraction device, the overall pair of stopper surfaces 41 are positioned further upward than the front-end surfaces of the pair of stopper pieces 31. Therefore, even when the outer column 22a displaces forward due to an impact load during a secondary collision, the front-end surfaces of the pair of stopper pieces 31 are prevented from hitting the pair of stopper surfaces 41, and the rear-end sections of the pair of long telescopic-adjustment holes 23a are allowed to come in contact with the adjustment rod 17a. As a result, it is possible to transmit the impact load during a secondary collision to the support bracket 15a by way of the adjustment rod 17a, cause the support bracket 15a to detach (displace) forward with respect to the vehicle body, and lessen the impact load that is applied to the operator. Even when the steering wheel 1 is vigorously displaced to the front-end position when adjusting the forward-backward position of the steering wheel 1, it is possible to keep an impact going forward from being applied to the support bracket 15a. In short, when determining the support strength of the support bracket 15a with respect to the vehicle body, it is not necessary to take into consideration an impact load going forward being applied to the support bracket 15 when adjusting the forward-backward position of the steering wheel 1, so designing the support strength of the support bracket 15a can be performed simply, and it is possible to easily lessen the impact load that is applied to the operator during a secondary collision.

During a secondary collision, there is a possibility that the cam member 27 will hit the bottom end section or the middle section of the rear-end surface of the second shock-absorbing section 42 of the stopper member 28 as the support bracket 15a displaces to the front of the vehicle body, however, even supposing that the cam member 27 hits the second shock-absorbing section 42, the second shock-absorbing section 42 and the first shock-absorbing section 38 are elastically compressed in the forward-backward direction, and thus the impact due to the collision can be lessened. Moreover, in the state in which the cam member 27 has hit the second shock-absorbing section 42, the front-end surface or the top surface of the cam member 27, as illustrated in FIG. 5, is inclined in a direction upward going toward the rear. Therefore, immediately after a collision occurs, the second shock-absorbing section 42 smoothly rides up on to the top surface of the cam member 27, and displacement of the support bracket 15a toward the front is allowed to continue.

When embodying the present invention, the construction of the portion where the support bracket is supported by the vehicle body so as to be able to detach forward due to an impact load that is applied during a secondary collision is not particularly limited, and it is also possible to employ construction in which a locking member is locked to a locking notch that is provided at one location in the center in the width direction. As disclosed in JP2013018472 (A), it is also possible to employ construction for the steering column in which the pair of held sections are formed by causing the front-end section of the outer column to bulge outward in the radial direction, and to provide a spacer for preventing looseness between the outer column and inner column.

The present invention can be applied to a steering device that includes only a telescopic mechanism of the telescopic mechanism and tilt mechanism. In that case, the pair of through holes on the vehicle body side are circular holes through which the adjustment rod can be passed.

As long as it is possible to press the stopper member in the up-down direction toward the steering column side, the construction of the bias means is not particularly limited. For example, when the bias means is an elastic member, it is possible to employ various shapes for the elastic member, the bias means can be integrally formed with the stopper member, or the bias means can be formed separate from the stopper member.

In the example in the figures, the present invention is such that the pair of held sections 13a are provided at two locations on the top surface of the outer column that are separated in the width direction, and the adjustment rod 17a is arranged so as to pass through the long telescopic-adjustment holes 23a in the pair of held sections 13a above the outer column 22a. However, the present invention can also be applied to a steering device having construction in which a pair of held sections are integrated with the outer column and provided at two locations on the bottom surface of the outer column that are separated in the width direction, and the adjustment rod is inserted through long telescopic-adjustment holes in the pair of held sections below the outer column. In that case, the location and orientation of the pair of pressure sections, the expansion/contraction device, the cam member and the stopper member of the present invention are reversed in the up-down direction.

EXPLANATION OF REFERENCE NUMBERS

1 Steering wheel
2 Steering-gear unit
3 Input shaft
4 Tie rod
5, 5a Steering shaft
6, 6a Steering column
7 Universal joint
8 Intermediate shaft
9 Universal joint
10, 10a Housing
11 Electric motor
12 Tilt pivot shaft
13, 13a Held section
14 Vehicle body
15, 15a Support bracket
16, 16a Support-plate section
17, 17a Adjustment rod
18, 18a Long tilt-adjustment hole
19, 19a Inner shaft
20, 20a Outer shaft
21, 21a Inner column
22, 22a Outer column
23, 23a Long telescopic-adjustment hole
24a, 24b Pressure section
25 Adjustment lever
27 Cam member
28 Stopper member
29 Slit
30 Support tube
31 Stopper piece
32 Installation-plate section
33 Locking member
34 Locking notch
35 Through hole
36 Main stopper
37 Lift section
38 First shock-absorbing section
39 Narrow width section
40 First through hole
41 Stopper surface
42 Second shock-absorbing section
43 Bias spring
44 Standing plate section
45 Bent-back plate section
46 Hanging plate section
47 Projecting plate section
48 Pin
49 Fastening plate
50 Second through hole

What is claimed is:

1. A steering device, comprising:
a steering column; a pair of held sections; a pair of long telescopic-adjustment holes; a support bracket; a pair of vehicle-side through holes; an adjustment rod; a pair of pressure sections; an expansion/contraction device; a cam member; a fastening member; and a stopper member;
the steering column having an inner column and an outer column, the steering column constructed by fitting together the rear section of the inner column with the front section of the outer column so that relative displacement in the axial direction is possible, and rotatably supporting an extendable/contractible steering shaft on the inside of the steering column;
the pair of held sections integrally provided with the outer column at two locations on the top surface or the bottom surface of the outer column that are separated in the width direction;
the pair of long telescopic-adjustment holes provided in portions of the pair of held sections that are aligned with each other, and extending in the axial direction of the outer column;
the support bracket having a pair of support-plate sections that sandwich the pair of held sections from both sides in the width direction, and is supported by a vehicle body so as to be able to detach forward due to a load that is applied during a secondary collision;
the pair of vehicle-side through holes provided in portions of the pair of support-plate sections that are aligned with each other;
the adjustment rod provided so as to pass in the width direction through the pair of long telescopic-adjustment holes and the pair of vehicle-side through holes;
the pair of pressure sections provided on portions of both end sections of the adjustment rod that protrude from the outside surfaces of the pair of support-plate sections;
the expansion/contraction device expanding or contracting the space between the pair of pressure sections;
the cam member fastened to a portion of the adjustment rod that is located between the pair of held sections in the middle section in the axial direction of the adjustment rod;

the fastening member provided such that the forward-backward position with respect to the vehicle body is regulated; and the stopper member having a stopper surface that faces toward the rear when the stopper member is supported by the fastening member; and one side surface in the up-down direction that faces the outside surface of the steering column and comes in contact with the outer-circumferential surface of the cam member when the stopper member is supported by the fastening member, and the stopper member being constructed so that in the state in which the space between the pressure sections is expanded by the expansion/contraction device, the stopper surface is displaced toward the steering column side by the cam member, and when the outer column is displaced forward, the stopper surface hits a portion that displaces forward together with the outer column before the rear-end sections of the pair of long telescopic-adjustment holes hit the outer-circumferential surface of the adjustment rod, and in the state in which the space between the pair of pressure sections is contracted by the expansion/contraction device, the stopper surface is displaced in a direction going away from the steering column by the cam member, and even when the outer column displaces forward, the stopper surface does not hit the portion that displaces forward together with the outer column before the rear-end sections of the long telescopic-adjustment holes hit the outer-circumferential surface of the adjustment rod.

2. The steering device according to claim 1, wherein the fastening member is located on the front side of the inner column;

the stopper member comprises a main stopper that has a front-end section and a rear-end surface, where the stopper surface is provided on the rear-end surface of the main stopper, and the front-end section of the main stopper is supported by the fastening member; and in a state in which the stopper surface hits the portion that displaces forward together with the outer column, the main stopper is held in the forward-backward direction between the portion that displaces forward together with the outer column and the fastening member.

3. The steering device according to claim 2, wherein the stopper member comprises a lift section that is provided so as to extend toward the rear from a portion of the rear-end surface of the main stopper that is separated from the stopper surface, and the one side surface in the up-down direction of the stopper member is provided on the lift section.

4. The steering device according to claim 1, wherein the stopper member has a bias means, and the stopper member is pressed in the up-down direction toward the steering column side by the bias means.

5. The steering device according to claim 4, wherein the stopper member is supported by a stopper pivot shaft that is arranged in the width direction so as to be able to pivot with respect to the fastening member; and the stopper member is pressed by the bias means in a direction so as tilt centered around the stopper pivot shaft toward the steering column side.

6. The steering device according to claim 5, wherein the bias means is an elastic member that is provided between the stopper member and the fastening member.

7. The steering device according to claim 6, wherein the elastic member is integrally provided with the stopper member.

8. The steering device according to claim 1, wherein the stopper member has a shock-absorbing section that elastically deforms a lot compared to other portions when at least one impact is applied of the impact that is applied when the portion that displaces forward together with the outer column hits the stopper surface, and the impact that is applied when the cam member and the stopper member hit during a secondary collision.

* * * * *